United States Patent [19]
Logsdon

[11] 3,942,552
[45] Mar. 9, 1976

[54] WIDE RANGE ADJUSTABLE AIR VOLUME REGULATOR

[75] Inventor: Hillard Glenn Logsdon, Charlotte, N.C.

[73] Assignee: Aeronca, Inc., Pineville, N.C.

[22] Filed: Feb. 1, 1974

[21] Appl. No.: 438,625

[52] U.S. Cl. .................. 137/517; 251/337; 236/49; 137/512.15
[51] Int. Cl.² ...................................... F16K 15/14
[58] Field of Search ............ 137/512.1, 512.15, 517, 137/518, 522, 523, 524, 505.14; 267/158, 160, 164; 236/35.3, 16, 49; 251/337

[56] References Cited
UNITED STATES PATENTS

| | | | |
|---|---|---|---|
| 1,666,609 | 4/1928 | Soffge | 137/505.14 X |
| 2,263,980 | 11/1941 | Carlson | 137/521 |
| 2,365,223 | 12/1944 | Silverstein et al. | 236/35.3 X |
| 2,890,716 | 6/1959 | Werder | 137/517 X |
| 3,037,528 | 6/1962 | Baars et al. | 138/46 |
| 3,053,275 | 9/1962 | Waterfill | 137/521 X |
| 3,084,711 | 4/1963 | Phillips et al. | 137/521 |
| 3,185,141 | 5/1965 | Miracki et al. | 267/158 X |
| 3,394,769 | 7/1968 | Smith et al. | 137/517 X |
| 3,425,443 | 2/1969 | Smith | 137/512.15 |
| 3,848,799 | 7/1973 | Day | 236/49 |

Primary Examiner—William R. Cline
Attorney, Agent, or Firm—Parrott, Bell, Seltzer, Park & Gibson

[57] ABSTRACT

An adjustable air volume regulator adapted for maintaining a constant volume flow of air therethrough regardless of variations in pressure of the air being supplied to the regulator and being adjustable for accurately maintaining a constant flow of air over a wide range of flow rates. The regulator includes a housing defining a passageway for the flow of air therethrough, valve means movable within the housing for adjustably restricting the flow of air therethrough, reciprocable linkage means cooperating with the valve means for controlling movement thereof, a spring mounted exteriorly of the housing and being connected to the linkage means for exerting an opening bias on the valve means in opposition to a closing bias imparted thereon by the pressure of the air in the housing, and means cooperating with the spring means for varying the biasing effect imparted thereby by varying the effective length of the spring for thereby adjusting the regulator to maintain a different substantially constant flow rate. The regulator may be provided with control means responsive to a demand for an increased or decreased flow of air through the regulator for adjusting the biasing effect of the spring.

13 Claims, 12 Drawing Figures

WIDE RANGE ADJUSTABLE AIR VOLUME REGULATOR

This invention relates to air-conditioning systems and more particularly to an air volume regulator adapted for maintaining a substantially constant volume flow of air therethrough.

In air-conditioning systems where air is supplied from a central conditioning device to a plurality of individual distributing units or terminals, changing demands for air in the rooms or zones being conditioned will cause pressure variations in the air delivery lines with resultant variations in the volume of air flowing therethrough. Accordingly, the individual air distributing units are conventionally provided with air volume regulators adapted for maintaining a substantially constant volume flow of air therethrough regardless of variations in pressure in the air delivery lines leading thereto.

Such air volume regulators conventionally include a valve member mounted in the path of air flow and adapted for movement in response to variations in air supply pressure for thereby adjustably restricting the size of the air passageway through the regulator. A spring is provided cooperating with the valve member for exerting an opening bias on the valve member in opposition to a closing bias exerted thereon by the air pressure in the housing. Thus, an increase in pressure of the air being supplied to the regulator causes the valve to provide a greater restriction to the air flow therethrough, while a decrease in pressure permits the valve to open more fully to thereby maintain the flow of air through the regulator at a substantially constant rate.

Air volume regulators of this type are conventionally adapted for being manually adjusted so as to maintain a different flow rate by varying the pre-tension exerted on the spring. However, adjustment in this manner is effective only over a relatively narrow range of flow rates. When adjustment of the regulator to a substantially different flow rate is desired, it is necessary to replace the spring with one of different characteristics. Since volume regulators are generally mounted within a duct or housing and are therefore not readily accessible, manual adjustment of the spring pre-tension or replacement of the spring is a difficult and time consuming operation. Further, since a variety of different springs are required for several various ranges of flow rates, it is necessary to maintain an inventory of the springs to permit ready adjustment of the regulators in an air-conditioning system.

Air volume regulators have also been provided which are adapted for being adjusted automatically to a different flow rate. Regulators of this type have particular applicability in variable volume air-conditioning systems where the volume of air being supplied to a room or zone is varied in response to changing demands for the conditioned air in the room or zone. The prior adjustable air volume regulators have had several shortcomings, including the inability to accurately maintain constant volume flow at all flow rate settings, a narrow range over which the regulator is adjustable, and the inability to completely shut off the air flow when this is desired.

One such adjustable regulator is disclosed in Warren U.S. Pat. No. 3,433,410, issued Mar. 18, 1969. This regulator employs a pair of side-by-side spring biased valve means, each being adapted for maintaining a predetermined constant flow of air therethrough and with the total air flow from the two valves corresponding to the desired maximum flow of air from the regulator. Means are provided for overriding the biasing spring of one of the two valve means to thereby force this valve into a closed position when a minimum flow of air is required, and for partially closing the valve when an intermediate flow of air is required. When this valve is maintained in a partially closed position by the overriding means, so as to thereby provide an intermediate flow of air through the regulator, the valve is unable to move in response to variations in pressure of the supply air and therefore does not maintain uniform flow therethrough. Thus, this type of regulator is not able to accurately maintain a constant volume flow of air at intermediate settings between the desired maximum and minimum rates since at such settings the biasing spring of one of the valves is not operative. Additionally, this regulator is not adapted for completely shutting off the air flow. Further, this type of adjustable regulator has a fairly narrow operating range of flow rates through which it may be automatically adjusted, and relies upon manual adjustment of spring pre-tension or manual spring replacement for adjusting the regulator to a different operating range.

With the foregoing in mind, it is an object of this invention to provide an air volume regulator adapted for maintaining a substantially constant flow of air therethrough regardless of variations in the pressure of the air being supplied to the regulator, and wherein the regulator is adjustable and adapted for accurately maintaining a constant volume flow of air over a wide range of flow rates.

It is another object of this invention to provide an adjustable volume regulator of the type described which is adapted for being mounted in an air distribution duct and which may be easily adjusted over a wide range for maintaining a different flow rate without requiring access to the regulator or replacement of the biasing spring component thereof.

It is a further object of this invention to provide an adjustable air volume regulator of the type described which is suitable for use in a variable volume air-conditioning system and which includes means responsive to a demand for an increase or decrease in the quantity of air being supplied to an air-conditioned room or zone for automatically adjusting the regulator to maintain a different flow rate, and wherein the air flow through the regulator may be entirely stopped if desired.

In accomplishing the above objects of this invention, a single spring is employed for maintaining accurate flow control over a wide range of flow rates, and the need for manual replacement of springs is thereby eliminated. In accordance with this invention, means are provided for changing the biasing characteristics of the spring to thereby obtain, in essence, an infinite number of different springs for controlling air flow in the regulator. More particularly, the regulator of the present invention changes the biasing characteristics of the spring by varying the effective length thereof.

Additionally, the regulators of this invention are able to maintain more accurate flow control at each control point or setting than prior regulators since, in essence, an infinite number of different springs are available for controlling the regulator rather than the limited number employed in the prior regulators, and it is therefore not necessary to alter the biasing force exerted by the spring by adjusting the pre-tension on the same. Regulators in accordance with the present invention easily maintain constant flow within an accuracy of ± 5% at a give flow setting, and often have demonstrated an ability to maintain constant flow within an accuracy as great as ± 0.5%.

In obtaining the important features of this invention, the air volume regulator includes a housing defining a passageway for the flow of air therethrough, valve means movable within the housing for adjustably restricting the air flow therethrough, a reciprocable linkage means cooperating with the valve means for controlling the movement thereof, spring means mounted exteriorly of the housing and being operatively connected to the linkage means for exerting an opening bias on the valve means in opposition to a closing bias imparted thereon by the pressure of the air in the housing so that the valve means is thereby adapted to maintain the air flow through the housing at a predetermined substantially constant rate regardless of variations in pressure of the air being supplied to the regulator, and means cooperating with the spring means for varying the biasing effect thereof by varying the effective length of the spring means to thereby permit adjusting the regulator to maintain a different substantially constant flow rate. The effective length of the spring is varied by providing restraining means engaging the spring means in spaced relation to the interconnection of the linkage means therewith and means cooperating with the restraining means for varying the position thereof along the length of the spring means.

More particularly, for facilitating obtaining a wide range of flow control, the spring is disclosed in the form of an elongate leaf spring having opposite end portions thereof carried by the housing and having the medial portion thereof connected to the linkage means so that reciprocating movement of the linkage means causes deflection of the leaf spring. A trackway is provided extending alongside the leaf spring substantially parallel thereto and a pair of carriage means are provided adapted for movement along the trackway while engaging the leaf spring along its length for thereby effectively shortening or lengthening the working length of the leaf spring.

The arrangement of the spring and restraining means is such that a relatively small amount of movement and a relatively low force is required for varying the effective length of the spring. Thus, the spring may be easily adjusted by a conventional relatively inexpensive operator, such as a pneumatic or electric motor. It will be appreciated that this feature makes the regulator of this invention particularly adapted for use in a variable volume air-conditioning system, wherein the regulator is adjusted automatically to maintain a different flow rate in response to the demands for a different quantity of air in an air-conditioned room or zone.

Regulators in accordance with this invention may be adjusted for maintaining constant flow over a very wide range of flow rates not heretofore obtainable with a single regulator. By way of comparison, one of the regulators produced in accordance with this invention has a range of flow rates which heretofore required the use of four different sized regulators and necessitated the manual replacement of as many as thirteen different springs.

Some of the objects and advantages of the invention having been stated, others will appear as the description proceeds when taken in connection with the accompanying drawings, in which.

Figure 1:
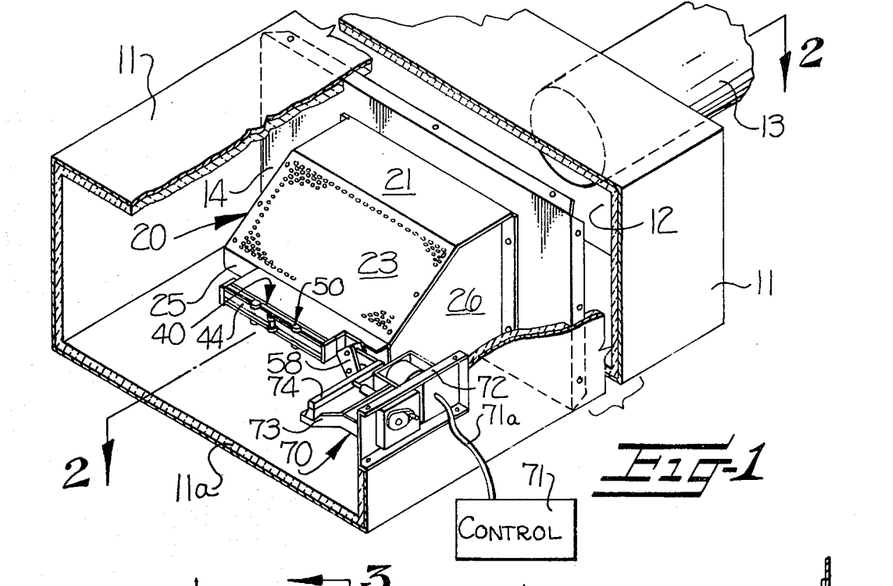
FIG. 1 is a perspective view, with parts broken away, of a portion of an air distribution unit employing an adjustable air volume regulator in accordance with the invention.

Referring now more particularly to the drawings, FIG. 1 illustrates an air distribution unit or terminal adapted for being installed in a central air-conditioning system for controlling the flow of conditioned air into an air-conditioned zone or room. The air distribution unit includes a hollow generally rectangular housing 11 having opposing pairs of side walls and an end wall 12 at the upstream end thereof. Thermal and sound insulation 11a is provided on the walls of housing 11. An air distribution line 13 supplying conditioned air under relatively high pressure and velocity from a central conditioning device communicates with housing 11 through an opening in end wall 12 thereof. Housing 11 also includes a wall 14 near the upstream end thereof in spaced relation from wall 12 and having an opening therein through which the air from air distribution line 13 may flow.

As noted earlier, changing demands for air in the various zones or rooms of an air-conditioned building will cause pressure variations in the air distribution lines with resultant variations in the volume of air flowing therethrough. Accordingly, an air volume regulator, generally indicated by the reference character 20 is mounted on wall 14 surrounding the opening therein and is adapted for controlling the flow of air therethrough for maintaining a substantially constant volume flow of air to the room or zone being conditioned.

A control means, generally indicated by reference character 70, is mounted on one side wall of housing 11 and is operatively connected to volume regulator 20 to permit adjusting the regulator for maintaining a different rate of flow of air therethrough. A sensing unit 71, located remotely of the air distributing unit, as for example in the air-conditioned room or zone, is connected to control means 70 and serves to sense a demand for an increased or decreased flow of air through the air volume regulator 20.

Figure 2:
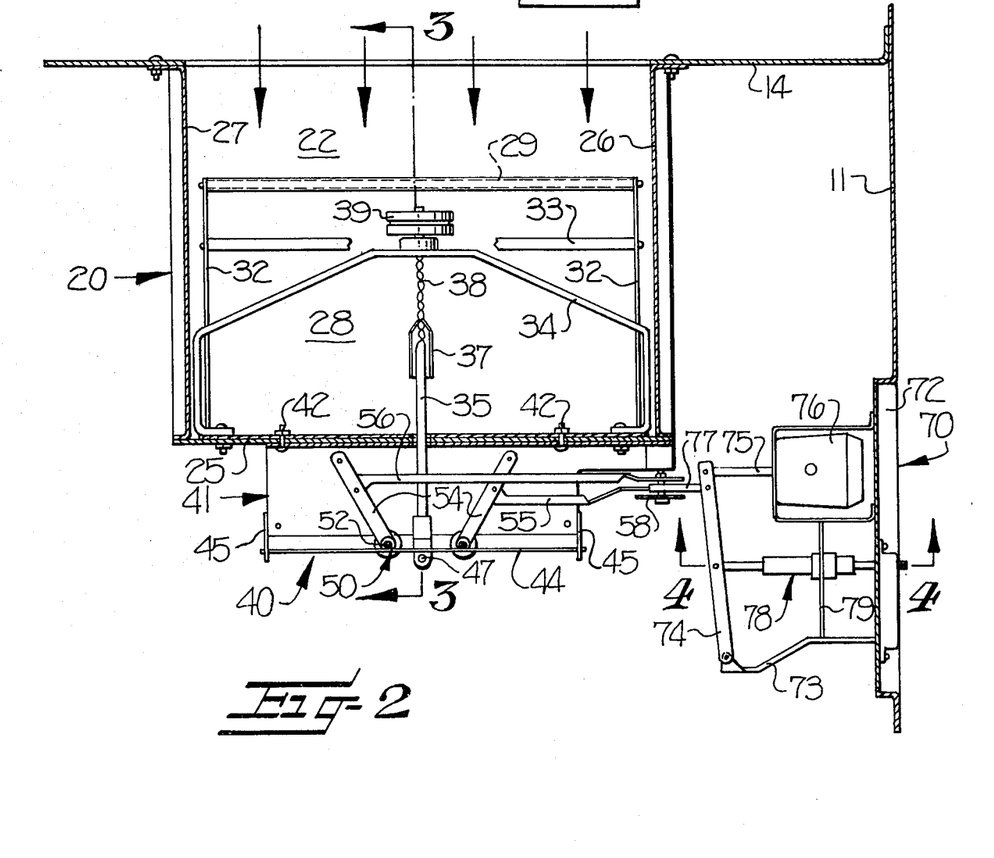
FIG. 2 is a horizontal sectional view of a portion of the air distribution unit taken substantially along line 2—2 of FIG. 1.
Figure 3:
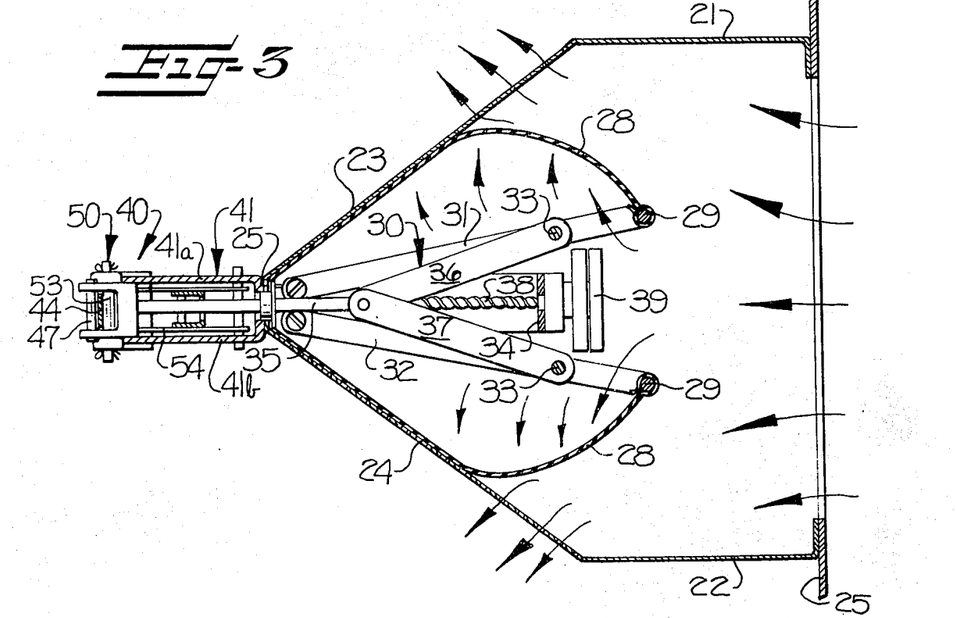
FIG. 3 is a vertical sectional view of the air volume regulator taken substantially along line 3—3 of FIG. 2.

Referring now more particularly to the construction of the volume regulator 20, the regulator includes a peaked housing having the base or inlet end thereof open and connected to wall 14 for receiving the flow of air therethrough, and having opposed parallel generally rectangular upper and lower side walls 21 and 22 extending downstream from the base or inlet end of the housing for a short distance. Inclined perforated upper and lower side walls 23, 24 extend angularly toward one another from the downstream edge of side walls 21 and 22 to the apex of the housing where they join a downstream wall 25. Volume regulator 20 also includes opposing end walls 26 and 27 at opposite ends of the regulator.

Referring to FIGS. 2 and 3, a curtain means 28 of flexible imperforate material is attached within regulator 20 to the inner surface of downstream wall 25 and extends upstream therefrom a sufficient distance to cover the perforated inclined upper side wall 23 of the housing. An identical curtain means 28 is provided on the lower side of the regulator extending upstream for covering the lower perforated inclined side wall 24.

As illustrated, the inclined perforated walls 23 and 24, and the flexible curtain means 28 which cooperate therewith, are rectangular in shape, having a length substantially greater than the height thereof. It has been found that by changing the configuration of the perforated walls and curtain means of the regulator from a substantially square form as has been employed in prior flexible curtain regulators and in which the aspect ratio is about 1, to an elongate rectangular form wherein the aspect ratio is greater than 1 and preferably from about 2 to about 3, the range of flow rates over which the regulator is effective can be increased substantially, thereby providing an even greater range of flow rates over which the regulator may be adjusted. Additionally, the air flow through the elongate rectangular perforated wall is noticeably quieter than through a square perforated wall of the same surface area.

The free ends of each of the pair of curtain means 28 are affixed to a pair of parallel rod means 29 extending transversely of the housing generally parallel to side walls 21, 22, 23 and 24. Linkage means, generally indicated at 30, is connected to each of the rod means 29 and is adapted for controlling movement of the curtain means 28 into and out of engagement with the inclined perforated side walls 23, 24 for adjustably covering or uncovering the perforations therein to thereby adjust the area of the air passageway through regulator 20.

Linkage means 30 includes pairs of oppositely disposed link arms 31 and 32 at opposite ends of the housing, each having one end thereof pivotally connected to downstream wall 25 and having the opposite end thereof connected to an end of one of the rod means 29 for thereby moving the same toward and away from inclined perforated walls 23 and 24. An additional rod means 33 is provided extending transversely of the housing in parallel relation to each rod means 29 and interconnects corresponding link arms 31 and 32 at opposite ends of the housing. A generally U-shaped support bracket 34 has opposite ends thereof mounted on wall 25 and a medial portion thereof extending inwardly and transversely of the housing. Linkage means 30 also includes a reciprocable push rod 35 extending outwardly from within the housing through a hole in downstream wall 25 and engaging an elongate leaf spring 44 mounted on the exterior of the housing, as described in more detail later.

The innermost end of push rod 35 has pivotally connected thereto pairs of oppositely disposed link arms 36, 37, which, in turn, have their free ends pivotally connected to a medial portion of rod means 33. In accordance with this linkage arrangement, the movement of curtain means 28 toward a closed position will cause push rod 35 to be moved axially inwardly into the housing of regulator 20 while deflecting the leaf spring 44, as described later.

From the foregoing description, it will be apparent that variations in pressure on the upstream side of regulator 20 will cause movement of the flexible curtain means 28 toward and away from the inclined perforated side walls 23 and 24 to progressively cover and uncover the perforations therein, for thereby maintaining a substantially uniform flow of air through the regulator regardless of the variations in the supply air pressure.

In order to prevent hunting and fluttering of the curtain means 28 when upstream air pressure periodically varies, linkage means 30 also includes a dampening mechanism adapted for resisting any rapid movement of the curtain means 28. This dampening mechanism includes an elongate spiral threaded member 38 connected to the inner end of push rod 35 and extending coaxially therewith, and a flywheel 39 carried by support bracket 34 and cooperating with the threaded member 38 so as to revolve upon axial movement of push rod 35. A dampening mechanism of this type is disclosed in Smith et al U.S. Pat. No. 3,394,769, issued July 30, 1968, to which reference may be made for further details of the structure and operation of this type of mechanism.

Referring to FIGS. 1 and 2, the volume regulator 20 includes a spring adjustment mechanism, generally indicated at 40, mounted on the downstream end thereof and including an elongated channel-shaped frame 41 of generally U-shaped cross section and having spaced parallel opposing side walls 41a and a bottom wall 41b secured by suitable fastener means 42 to the outer surface of wall 25 of the volume regulator 20. An elongate flexible leaf spring 44 has opposite end portions thereof received in slots in upstanding flanges 45 at opposite ends of frame 41 and is retained in place by a cotter key 46 positioned through a hole at each end of the spring 44. A medial portion of the spring 44 is surroundingly engaged by a clevis and clevis pin assembly 47 which is carried at the outermost end of push rod 35 and adapted for engaging spring 44 to deflect the same as push rod 35 moves inwardly and curtain means 28 moves toward a closed position.

Although the leaf spring 44 is illustrated herein as being carried by the housing at opposite ends thereof, if desired, the spring could be carried by the housing at only one end thereof, with the clevis assembly 47 engaging the spring near the opposite end thereof. However, the illustrated form has been found to provide a simple, efficient and compact arrangement.

In order to permit adjusting the regulator for maintaining a different flow rate, means are provided on opposite sides of the clevis assembly 47 for engaging leaf spring 44 and restraining movement to thereby shorten the effective or working length of the spring. This restraining means is adjustably positionable along the length of leaf spring 44 to permit varying the effective length thereof over a wide range. Varying the effective or working length of the spring in this manner varies the biasing characteristics of the spring and thereby varies the degree or amount to which the spring will hold the curtain means 28 open in opposition to the closing bias of a predetermined supply air pressure thereagainst.

More particularly, by shortening the effective or working length of the spring, the flexibility thereof is decreased and the spring constant or spring rate is increased. Within the elastic limit of the spring, the force required to deflect or displace the spring a unit of length is constant and is customarily referred to as the "spring rate" or "spring constant" of the spring.

Figures 7, 8, 9:
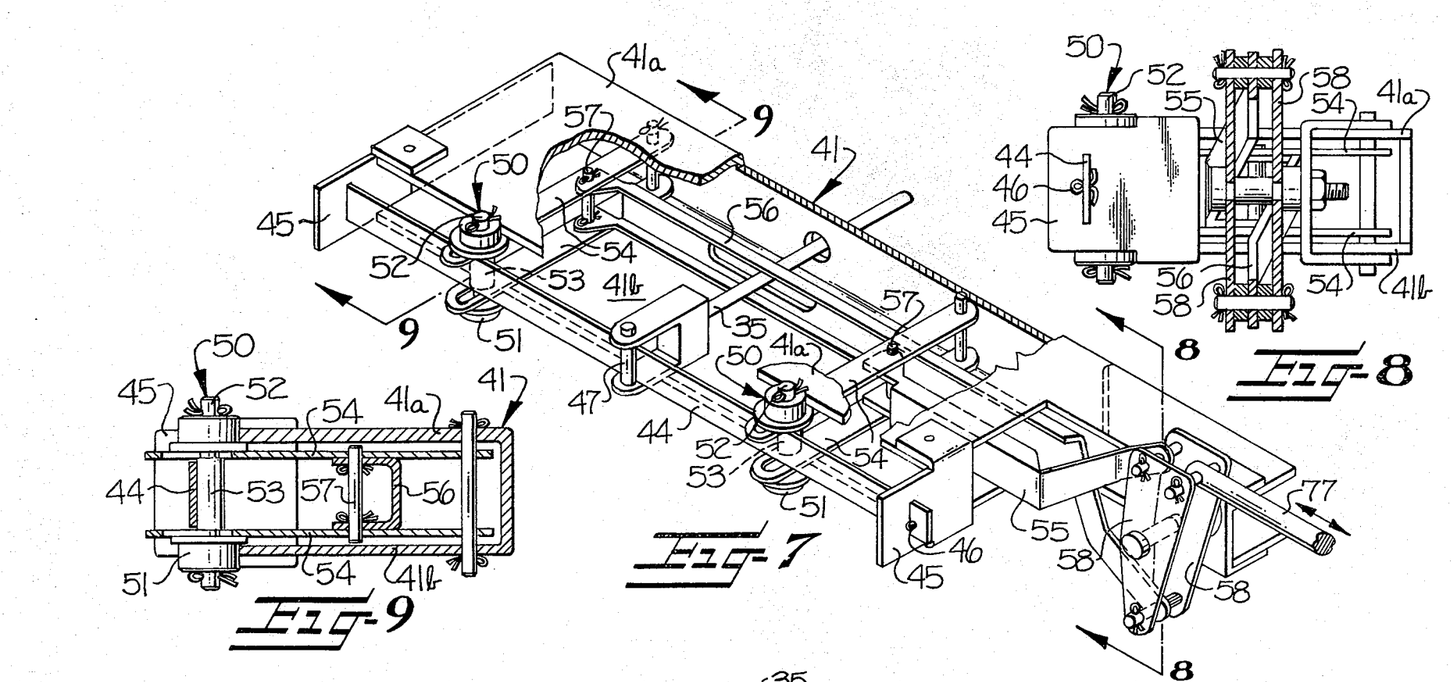
FIG. 7 is a detailed perspective view, with parts broken away, of the spring and spring adjustment mechanism of the volume regulator.
FIG. 8 is a vertical sectional view taken substantially along line 8—8 of FIG. 7.
FIG. 9 is a vertical sectional view taken substantially along line 9—9 of FIG. 7.

Referring more particularly to FIG. 7, each restraining means comprises a carriage assembly 50 which is adapted for movement along the length of spring 44 in a trackway extending in spaced apart parallel relation to spring 44 and defined by the uppermost edges of the opposing frame side walls 41a. More particularly, each carriage assembly 50 includes a pair of flanged wheels 51 carried by an axle 52 and maintained in spaced apart relation by a bushing 53 surrounding axle 52.

Each carriage assembly 50 is moved along the length of leaf spring 44 by carriage linkage means which cooperates with each carriage assembly 50 for moving the same simultaneously either toward or away from one another. The carriage linkage means includes a pair of link arms 54 pivotally mounted to the lower portion of frame 41 near opposite ends thereof and having an elongate longitudinally extending slot provided in the upper free end thereof through which axle 52 of the carriage assembly is positioned. A relatively short control arm 55 extends inwardly within the channel-shaped frame 41 from one end thereof for a relatively short distance and is pivotally connected to the pair of link arms 54 at the near end of the frame by a suitable connecting pin 57. A relatively long control arm 56 extends inwardly within frame 41 from the same end thereof and is pivotally connected by connecting pin 57 to the pair of link arms 54 at the far end of frame 41. The outer free ends of control arms 55 and 56 are connected to opposite sides of a lever assembly 58 pivotally mounted on an outwardly extending portion of frame 41 and adapted for moving control arms 55 and 56 in opposite directions to thereby move the pair of carriages 50 simultaneously either toward or away from one another for thereby adjusting the effective length of the spring 44. Movement of lever assembly 58 and control arms 55 and 56 is imparted by a reciprocable line 77 having one end thereof connected to lever assembly 58 and the opposite end thereof connected to control means 70, to be described in detail later.

The carriage linkage assembly is so constructed that a movement of less than 1 inch need be imparted to lever assembly 58 in order to move the pair of carriage assemblies 50 their entire limit of travel along the length of leaf spring 44. Thus, the spring adjustment mechanism of this invention is particularly adapted for being employed in association with a conventional pneumatic or electric prime mover wherein the reciprocable operator thereof ordinarily has a stroke of travel not exceeding about 1 inch.

The particular geometry of the spring adjustment mechanism permits a relatively low force to be employed for moving the carriage assemblies 50 along the length of the leaf spring 44, in spite of the fact that a force of considerable magnitude is exerted on the leaf spring by push rod 35 due to the closing bias of the air pressure on the certain means 28. More particularly, it will be readily seen that the length of travel of the carriage assemblies 50 along the leaf spring 44 is considerably greater than the outward movement which is imparted upon push rod 35 by stiffening of the leaf spring as the carriage assemblies are moved closed together. Thus, a mechanical advantage is provided for facilitating moving push rod 35 outwardly during shortening of the leaf spring in opposition to the inherent inward bias on the push rod 35 due to the closing bias of the air pressure. Thus, the spring adjustment mechanism is well-suited for being driven by a conventional pneumatic or electric prime mover, and moreover, may employ a relatively low-powered and therefore inexpensive prime mover.

Figures 10, 11:
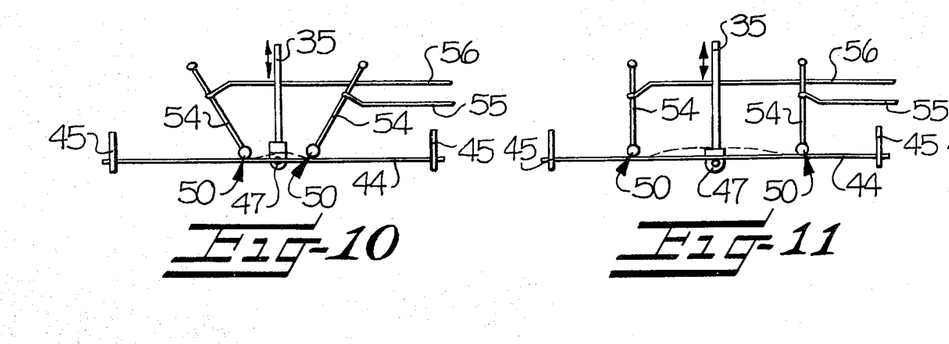
FIGS. 10–12 are plan views schematically illustrating the spring and spring adjustment mechanism at three different positions of operation.
Figure 12:
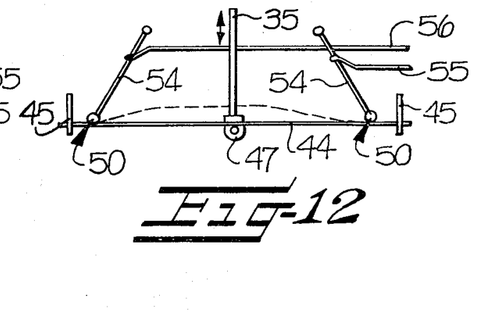

The limits of travel of the carriage assemblies 50 are illustrated in FIGS. 10–12. The setting for maximum air flow through the regulator is illustrated in FIG. 10. In this setting, the pair of carriages 50 are positioned closely adjacent one another near the middle of spring 44. Since the effective or working length of the spring is only that portion between the two carriages, the spring is relatively stiff at this setting and will deflect only a short distance. Thus, the flexible curtain means in regulator 20 are maintained in nearly fully opened position allowing maximum flow of air through the regulator. As illustrated in FIG. 10, the spring 44 is in relaxed condition. The dashed lines indicate the biased or deflected configuration assumed by the leaf spring under the force of the air flowing through the regulator housing.

FIG. 11 illustrates an intermediate setting of the spring adjustment mechanism wherein the pair of carriages 50 are positioned approximately midway between the middle of the spring 44 and the opposite ends thereof. At this setting the flexible curtain means of the regulator are permitted to partially close and the air flow through the regulator is maintained at a somewhat lower rate.

As illustrated in FIG. 12, the pair of carriages 50 are positioned in widely spaced apart relation near opposite ends of the spring 44. The long effective length of the spring at this setting permits the spring to deflect a relatively large amount under the force of the air through the regulator is indicated by the dashed lines. At this setting, push rod 35 may move inwardly a sufficient distance to permit the flexible curtain means of the regulator to fully close and entirely shut off the flow of air through the regulator 20.

It will be appreciated from the foregoing that the spring adjustment mechanism of this invention permits adjusting the regulator continuously or infinitely through a wide range of flow rates ranging from zero to a maximum which is determined by the particular design and dimensions of the regulator. Further, the spring adjustment mechanism completely eliminates the need for manual spring replacement or spring pretension adjustment and permits easily adjusting the regulator, either automatically or manually, from externally of the housing 11.

To facilitate adjustment of the regulator from externally of the housing 11, control means 70 is mounted on one side wall of the housing and is connected to the carriage linkage assembly within housing 11 and includes adjustment means externally of the housing for adjusting the pair of carriage assemblies 50. As illustrated in FIGS. 1 and 2, the control means is adapted for use in a variable volume air-conditioning system and includes means for automatically adjusting the flow rate setting of the regulator in accordance with the demands of the room or zone being conditioned. As described more fully hereinafter, slight modifications of the control means 70 will adapt the same for use in a constant volume system where it is not necessary to automatically vary the volume of the regulator but where it may be desirable to provide means for easily manually adjusting the regulator externally of housing 11 to a different flow rate.

Referring now more particularly to the illustrated embodiment, the control means 70 includes a rectangular frame 72 mounted in a correspondingly shaped opening in the side wall of housing 11 and having a post 73 extending inwardly therefrom at one end of the frame. A linkage arm 74 has one end thereof pivotally mounted to the inner end of post 73 with the opposite end thereof being pivotally mounted to the reciprocable plunger 75 of any suitable prime mover, such as the pneumatic operator 76 illustrated. As noted earlier, the prime mover may be relatively low-powered and may have a stroke of no more than about one inch.

A control or sensing unit 71, located remotely of the regulator, is operatively connected to pneumatic operator 76 through a control line 71a, and serves to control operation of the pneumatic motor in response to varying external conditions. Sensing unit 71, for example, may comprise a thermostat located in the room or zone being conditioned and which is responsive to the varying temperature in the room for thereby causing an increased or decreased flow of air through regulator 20 to the room or zone. A link 77 is provided interconnecting linkage arm 74 with lever assembly 58 so that movement of plunger 75 of the pneumatic operator causes pivotal movement of linkage arm 74 and also causes pivotal movement of level assembly 58 to thereby adjust the position of the pair of carriage assemblies 50. As illustrated, control means 70 also includes an adjustment assembly, generally indicated at 78, which is carried by an inner supporting wall 79 of frame 72. Adjustment assembly 78 is connected at one end thereof to linkage arm 74 and includes a portion at the opposite end thereof extending outwardly from frame 72 for permitting manual adjustment of the volume regulator. In the illustrated embodiment, the adjustment assembly 78 serves as a limit means for restricting movement of the carriage linkage assembly between maximum and minimum limits for thereby controlling the maximum and minimum flow rates of the volume regulator.

Figure 4:
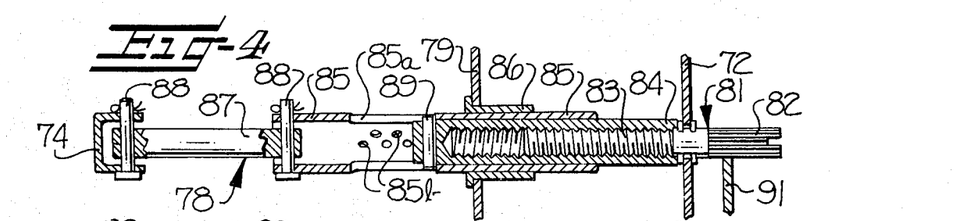
FIG. 4 is a vertical sectional view of a portion of the control means for the air volume regulator, taken substantially along line 4—4 of FIG. 2.
Figure 5:
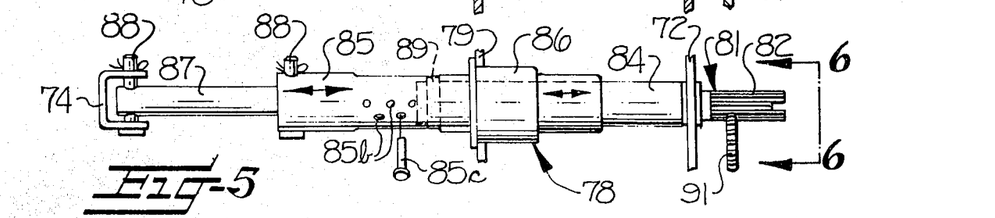
FIG. 5 is a side elevational view corresponding to FIG. 4.
Figure 6:
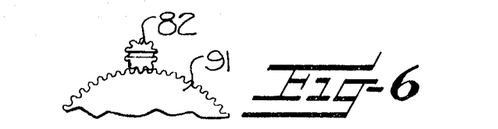
FIG. 6 is an enlarged detailed end view of a portion of the regulator control means looking in the direction of the arrows of line 6—6 of FIg. 5.

Referring more particularly to the adjustment assembly 78 as illustrated in FIGS. 4 and 5, an adjustment rod 81 is rotatably carried in frame 72 and includes an outwardly extending portion 82 with longitudinal gear teeth thereon and an inwardly extending helically threaded portion 83. An internally threaded inner control sleeve 84 cooperates with the helically threaded portion 83 of adjustment 81 so as to be moved axially as adjustment rod 81 is turned manually from externally of housing 11. An elongate tubular outer control sleeve 85 has one end portion thereof positioned surrounding the inner control sleeve 84 and is supportably carried by a bushing 86 mounted on the inner supporting wall 79. A link 87, secured by pins 88, interconnects the opposite or innermost end of outer control sleeve 85 with linkage arm 74 so that pivotal movement of linkage arm 74 causes outer control sleeve 85 to be moved axially inwardly or outwardly over inner sleeve 84.

As seen most clearly in FIG. 4, a pin 89 is positioned through a transversely extending hole in the inner end of control sleeve 84 and cooperates with a longitudinally extending slot 85a in opposite sides of outer control sleeve 85 to thereby limit the axial movement of the outer control sleeve 85. As illustrated, pin 89 is positioned abutting one end of slot 85a and thereby limits further inward axial movement of outer sleeve 85 and further inward pivotal movement of linkage arm 74 for positioning carriage assemblies 50 closer together. Accordingly the maximum flow rate of the regulator is also limited. By manually turning adjustment rod 81, the position of pin 89 in slot 85a may be changed, and the maximum flow rate limit of the regulator may be thus adjusted.

The length of slot 85a is correlated to the maximum range of the regulator so that when outer sleeve 85 is pushed to the right in FIG. 4 and pin 89 abuts the opposite end of slot 85a, the spring is adjusted so as to permit the curtain means 28 to fully close and block the air flow through the regulator. However, in some instances it may be desirable to maintain a predetermined minimum air flow through the regulator under all conditions of adjustment. In order to provide a lower flow rate limit in the regulator, holes 85b are provided in the outer control sleeve 85 through which a cotton key 85c may be positioned for thereby reducing the effective length of the slot 85a. Each hole 85b corresponds to a predetermined percentage or fraction of the maximum capacity of the regulator.

An indicator wheel 91 is provided on the outer surface of frame 72 to facilitate adjustment of the regulator. Indicator wheel 91 has gear teeth formed in the outer periphery thereof which cooperate with the gear teeth in the outer portion 82 of adjustment rod 81 so that the indicator wheel 91 rotates when adjustment rod 81 is turned. Indicator wheel 91 may be calibrated to indicate the maximum flow rate at the various settings to thereby facilitate manually adjusting the regulator.

When it is desired to employ the volume regulator 20 in a constant volume air-conditioning system, the control means may be modified so to enable directly adjusting the control point or setting of the regulator by merely dialing the desired flow rate on the calibrated indicator wheel 91. While not illustrated, this modification merely involves removing the pneumatic operator 76 and positioning cottor key 85c in the last hole 85 on the right as illustrated in FIG. 4 to thereby reduce the effective length of slot 85a to zero. Thus, adjustment rod 81 provides a direct linkage to linkage arm 74 for manually adjusting the position of the carriage means 50 along the length of spring 44 merely by turning adjustment rod 81.

It will be appreciated from the foregoing that the adjustable volume regulator of the present invention has utility in a variety of applications where it is desired to maintain a constant volume flow of air over a wide range of flow rates and where it is desired to adjust the regulator either manually or automatically to a different flow rate.

In the drawings and specification there have been set forth preferred embodiments of the invention and although specific terms are employed, they are used in a generic and descriptive sense only and not for purposes of limitation.

That which is claimed is:

1. An air volume regulator comprising a housing defining a passageway for the flow of air therethrough, valve means movable within said housing for adjustable restricting the air flow therethrough, linkage means cooperating with said valve means for controlling movement thereof, a portion of said linkage means extending outwardly through said housing and being adapted for inward and outward movement with respect thereto, an elongate leaf spring having opposite end portions thereof carried by the exterior of said housing and having a medial portion thereof connected to said outwardly extending portion of said linkage means so that movement of said linkage means causes deflection of said leaf spring for exerting an opening bias on the valve means in opposition to a closing bias imparted thereon by the pressure of the air in the housing, said valve means being thereby adapted to maintain the air flow through the housing at a predetermined substantially constant rate regardless of variations in pressure of the air being supplied to the regulator, and a pair of restraining members engaging said leaf spring along its length on opposite sides of said linkage means and being adapted for movement toward or away from one another for thereby effectively shortening or lengthening the working length of said leaf spring so as to vary the spring constant for thereby adjusting the regulator to maintain a different substantially constant flow rate.

2. An air volume regulator according to claim 1 additionally comprising control means cooperating with said means for varying the position of said restraining means and being responsive to a demand for an increased or decreased flow of air through said regulator for thereby varying the effective length of said spring means.

3. An air volume regulator according to claim 1 wherein said valve means is movable in said housing from a fully open position allowing maximum air flow through said housing to a fully closed position allowing no air to flow through the housing, and wherein said means for varying the effective length of said spring means adjusts the regulator from a maximum air flow therethrough to no air flow therethrough and an infinite number of different flow rates therebetween.

4. An air volume regulator comprising a housing defining a passageway for the flow of air therethrough, valve means mounted for movement in said housing for adjustably restricting the air flow therethrough, linkage means cooperating with said valve means for controlling movement thereof, a leaf spring operatively connected to said linkage means for exerting an opening bias on the valve means in opposition to a closing bias imparted on the valve means by the pressure of the air in the housing, said valve means being thereby adapted to maintain the air flow through the housing at a predetermined substantially constant rate regardless of variations in pressure of the air being supplied to the regulator, movable restraining means engaging said leaf spring along the length thereof in adjustable spaced relation to the interconnection of said linkage means therewith, sensing means for determining the requirement for an increased or decreased flow of air through the regulator, and motive means cooperating with said sensing means and including a reciprocable plunger operatively connected to said movable restraining means and being reciprocably movable in response to said sensing means sensing a demand for an increased or decreased flow of air for changing the position of engagement of the restraining means along said leaf spring so as to vary the effective length of the spring and the spring constant for thereby adjusting the regulator to maintain a different substantially constant flow rate.

5. An air volume regulator according to claim 4 wherein said valve means is movable in said housing from a fully open position allowing maximum air flow through said housing to a fully closed position allowing no air to flow through the housing, and including adjustable limit means cooperating with said movable restraining means for limiting the movement thereof along the length of said leaf spring to thereby limit adjustment of the regulator to deliver air therethrough within a predetermined range of flow rates.

6. An air volume regulator comprising a housing defining a passageway for the flow of air therethrough, valve means in the form of flexible curtains mounted for movement in said housing for adjustably restricting the air flow therethrough, linkage means cooperating with said valve means for controlling movement thereof, a leaf spring carried by said housing and being connected to said linkage means so as to be deflected by movement of said linkage means for exerting an opening bias on the valve means in opposition to a closing bias imparted thereon by the pressure of the air in the housing, said valve means being thereby adapted to maintain the flow in said housing at a predetermined substantially constant rate regardless of variations in pressure of the air being supplied to the regulator, and means operatively connected to said housing and to said leaf spring and cooperating with said leaf spring for adjusting the opening bias exerted by the leaf spring on the valve means in opposition to the closing bias of the pressure of the air for thereby adjusting the regulator to maintain a different substantially constant flow rate 7. An air volume regulator according to claim 6 wherein said means for adjusting the opening bias exerted by the leaf spring comprises restraining means movable along the length of the leaf spring in engagement therewith for varying the effective length of the leaf spring.

8. An air volume regulator comprising a housing defining a passageway for the flow of air therethrough, an elongate leaf spring having opposite end portions thereof carried on the exterior of said housing, valve means positioned within said housing and being adapted for movement from a fully open to a fully closed position for adjustably restricting the flow of air through the housing and being biased toward a closed position by the pressure of the air in the housing, linkage means cooperating with said valve means and being adapted for movement as said valve means moves in said housing, said linkage means having a portion thereof extending outwardly from said housing and engaging a medial portion of said leaf spring so that movement of said valve means toward a closed position causes deflection of said leaf spring and thereby causes an opening bias to be exerted on the valve means in opposition to the closing bias of the air pressure, said valve means being thereby adapted to maintain the air flow through the housing at a predetermined substantially constant flow rate regardless of variations in pressure of the air being supplied to the regulator, and spring adjustment means carried by said housing and cooperating with said leaf spring for varying the effective length thereof to permit adjusting the regulator to maintain a different substantially constant flow rate, said spring adjustment means including a pair of restraining means engaging said leaf spring on opposite sides of said linkage means and being movable with respect thereto along the length of said leaf spring for effectively shortening or lengthening the working length of said leaf spring.

9. An air volume regulator according to claim 8 wherein said spring adjustment means includes means defining a trackway extending alonside said elongate leaf spring, and wherein said pair of restraining means each comprise carriage means adapted for movement along said trackway in engagment in engagement with said leaf spring for thereby varying the effective length of the leaf spring.

10. An air volume regulator according to claim 9 wherein said spring adjustment means includes carriage linkage means cooperating with each of said carriage means and adapted for moving the same simultaneously inwardly or outwardly toward or away from each other for thereby shortening or lengthening the working length of the leaf spring.

11. An air volume regulator according to claim 10 additionally including control means operatively connected to said spring adjustment means for effecting adjustment of said leaf spring, said control means including motive means cooperating with said carriage linkage means and operative in response to a demand for an increased or decreased flow of air through the regulator for effecting movement of said carriage means to adjust the effective length of said leaf spring, and adjustable means cooperating with said carriage linkage means for adjustably limiting the outward and inward movements of said carriage means thereby providing adjustable maximum and minimum limits of air flow through the regulator.

12. An air volume regulator comprising a housing including a pair of angularly disposed perforated walls adapted for the flow of air therethrough, flexible curtain means cooperating with each of said perforated walls for adjustably restricting the air flow therethrough, an elongate leaf spring having opposite end portions thereof carried on the exterior of said housing at the apex of said angularly disposed perforated walls, linkage means cooperating with said flexible curtain means and being adapted for reciprocating movement as said curtain means move toward and away from said perforated walls, said linkage means having a porton thereof extending outwardly from said housing and engaging a medial portion of said leaf spring so that movement of said flexible curtain means toward said perforated walls causes deflection of said leaf spring and thereby causes an opening bias to be exerted on the curtain means in opposition to a closing bias imparted thereon by the air pressure in the housing, said flexible curtain means being thereby adapted to maintain the air flow through the housing at a predetermined substantially constant flow rate regardless of variations in pressure of the air being supplied to the regulator, and spring adjustment means carried by said housing and cooperating with said elongate leaf spring for varying the effective length thereof to permit adjusting the regulator to maintain a different substantially constant flow rate, said spring adjustment means including a pair of movable restraining means engaging said leaf spring at equal distances on opposite sides of said linkage means and being simultaneously movable along the length of said leaf spring toward or away from one another for shortening or lengthening the working length of said leaf spring.

13. An air volume regulator according to claim 12 wherein said perforated walls are rectangular in shape and have a length substantially greater than the height thereof.

* * * * *

UNITED STATES PATENT AND TRADEMARK OFFICE
CERTIFICATE OF CORRECTION

PATENT NO. : 3,942,552
DATED : March 9, 1976
INVENTOR(S) : Hillard Glenn Logsdon It is certified that error appears in the above-identified patent and that said Letters Patent are hereby corrected as shown below:

Column 3, Line 2, change "give" to --given--.
Column 6, Line 58, after "movement" insert --thereof--.
Column 7, Line 63, change "certain" to --curtain--; Line 68, change "closed" to --closer--.
Column 8, Line 39, change "is" to --as--.
Column 10, Line 21, change "cotton" to --cotter--; Line 38, after "so" insert --as--; Line 43, change "cottor" to --cotter--; Line 65, CLAIM 1, change "adjustable" to --adjustably--.
Column 13, Line 29, CLAIM 11, after "means" insert --and--

Signed and Sealed this fifteenth Day of June 1976

[SEAL]

Attest:

RUTH C. MASON
Attesting Officer

C. MARSHALL DANN
Commissioner of Patents and Trademarks